RADIO DIVERSITY RECEIVING SYSTEM
Filed Aug. 26, 1958
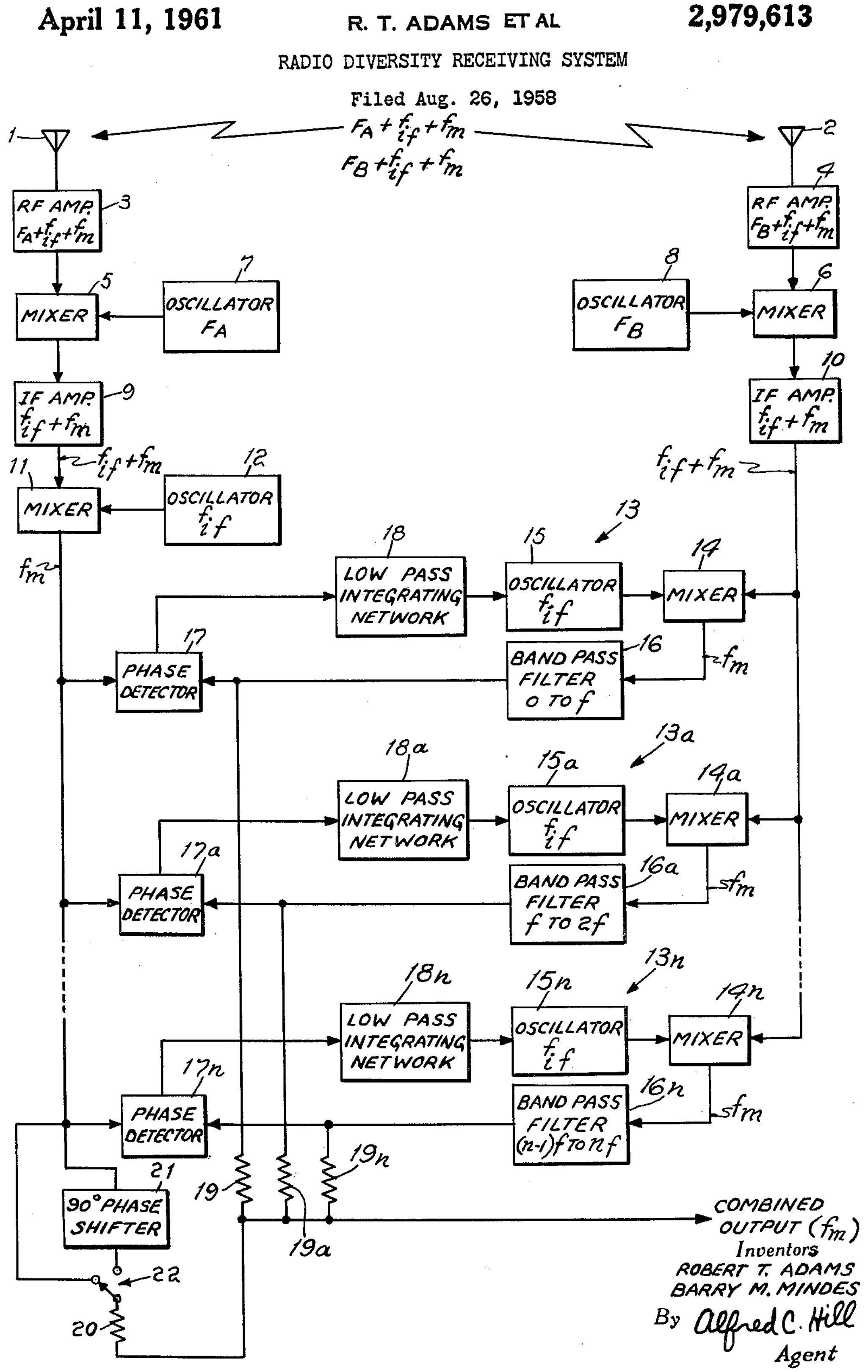
Inventors
ROBERT T. ADAMS
BARRY M. MINDES
By Alfred C. Hill
Agent 2,979,613

RADIO DIVERSITY RECEIVING SYSTEM

Robert T. Adams, Short Hills, N.J., and Barry M. Mindes, New York, N.Y., assignors to International Telephone and Telegraph Corporation, Nutley, N.J., a corporation of Maryland Filed Aug. 26, 1958, Ser No. 757,264

14 Claims. (Cl. 250—20)

This invention relates to communication systems and more particularly to radio diversity receiving systems.

One of the difficulties encountered in radio communication systems is that of fading. This difficulty is attacked by various forms of diversity systems, such as space, frequency or time diversity systems. In general, diversity systems provide some means whereby the receiver receives intelligence on a plurality of uncorrelated carrier signals, that is, carrier signals which fade independently of each other. The diversity signal combining receiver then acts upon these uncorrelated signals to derive a single output signal in which the undesired fading is substantially eliminated.

Long distance communication systems, particularly of normal ionospheric type or ionospheric scatter type, are subject to both flat (independent of frequency) fading caused by changes in the propagation medium and to selective fading resulting from multipath propagation. Flat fading has the characteristic of a Rayleigh distribution and can be adequately protected against by presently known diversity signal combining receivers. However, no satisfactory diversity signal combining receivers are presently in use for combating selective fading particularly where two selective fades or frequency cancellations occur in the pass band of the signals being combined. Consequently, high reliability communication has not yet been possible particularly in the HF and lower VHF frequency bands when the selective fading is severe.

The ineffectiveness of heretofore known diversity signal combining receivers is due to the following reasons. A multipath signal exhibits a non-uniform phase versus frequency characteristic as well as selective frequency cancellations in its pass band. If two such signals were combined by heretofore employed techniques, while those frequencies which did not have simultaneous nulls in both signals would not have a null in the combined output, frequencies which were present in both signals might be added in phase opposition and so produce a null in the combined output. The probability of the production of a null by this disadvantageous signal addition is almost equal to the number of selective frequency cancellations in the pass band of the received signals.

Therefore, an object of the present invention is to provide an improved diversity signal combining receiver.

Another object is to provide a diversity signal combining receiver which is extremely effective against selective fading.

Still another object is to provide a diversity signal combining receiver which will enable the achievement of high reliability communication particularly in the HF and lower VHF frequency bands in the presence of severe selective fading.

A feature of this invention is the provision of an arrangement to combine by addition the output intelligence signals of receiving channel signals and a means to modify the phase versus frequency characteristic of the intelligence signals of the receiving channels prior to addition in said adder means to avoid phase opposition at any frequency so that when added together no additional nulls will be produced in the spectrum of the signals being added and the nulls originally present in the received signals will be substantially eliminated.

Another feature is the provision of a diversity receiving system including a means to recover the intelligence signal of one of the received signals and means coupled to the other received signals to divide the intelligence bandwidth into a plurality of equal bandwidths segments. Each of the means to divide includes a phase detector to detect the phase difference between that portion of the intelligence signal occurring in its corresponding bandwidth segments and the corresponding frequency portion of the intelligence signal recovered from the other of the sources to produce a control signal proportional to the phase difference. This control signal is utilized in each of the means to divide to adjust the phase of that portion of the intelligence signal occurring in the particular segment for phase coincidence with the intelligence signal of said corresponding portion. The phase adjusted output of the two signal channels are then combined to provide a single combined output for utilization.

Still another feature is the provision of an automatic phase control system wherein a plurality of signals having the same intelligence signal in the same intelligence bandwidth are rendered phase coincident. The phase control arrangement includes a means to derive the intelligence signal of one of the signal sources. In addition, a means is coupled to the other of said signal sources to divide the intelligence bandwidth into a plurality of equal bandwidth segments with each of the means to divide including a means for detecting the phase difference between that portion of the intelligence signal occurring in each of the bandwidth segments and the corresponding frequency portion of the intelligence signal recovered from the first source to produce a control signal proportional to the phase difference. Means are included in each of the means to divide to respond to the control signal to adjust the phase of the portion of intelligence occurring in the corresponding one of the bandwidth segments for phase coincidence with the intelligence signal of said corresponding portion. The output of the means to divide is then combined such that there is present two identical phase coincident signals at the output of the phase control system.

The above-mentioned and other features and objects of this invention and the manner of obtaining them will become more apparent by reference to the following description taken in conjunction with the drawing, the single figure of which illustrates in block diagram form an embodiment of our invention.

In the drawing, a representative diversity receiving system is illustrated incorporating the signal combining arrangement of this invention. The receiver shown in the drawing will respond to frequency diversity or space diversity signals. In the case of space diversity signals, the antennas 1 and 2 are in spaced relation to provide an uncorrelated relation between identical frequency signals. In the case of frequency diversity signals, there is provided a spacing between the carrier signals such that the carrier frequencies of the diversity signals are uncorrelated. The signals induced in antennas 1 and 2 would be coupled to frequency selective circuits illustrated in the drawing as amplifiers 3 and 4 to establish receiving channels responding to the proper frequency. Amplifiers 3 and 4 are particularly necessary in frequency diversity signals where the carrier frequency $F_A$ and $F_B$ are spaced in frequency. In the case of space diversity systems where the carrier frequency $F_A$ and $F_B$ are of equal value, the radio frequency amplifiers 3 and 4 would not be necessary unless amplification is required. It should be mentioned at this point that the system of this invention will likewise respond to time diversity systems provided one of the signal channels incorporates a delay of sufficient value to render the received signals in each of the receiving channels time coincident.

The output of amplifiers 3 and 4 are coupled to mixers 5 and 6 of their corresponding receiving channels. The received signals coupled to mixers 5 and 6 are operated on by oscillators 7 and 8 to produce an intermediate frequency signal such as indicated in the drawing as $f_{if}$. This heterodyned or difference frequency includes the intelligence band indicated in the drawing as $f_m$; hence, the output of mixers 5 and 6 will be $f_{if}$ plus the intelligence band $f_m$. This output from mixers 5 and 6 may be coupled to IF amplifiers 9 and 10 of the respective receiving channels where amplification and frequency selectivity is required.

It should be pointed out at this time that the IF frequencies need not be identical nor is it required that oscillators 7 and 8 and mixers 5 and 6 be in the receiver since the remainder of the circuit includes heterodyning arrangements which would be sufficient to recover the intelligence bandwidth $f_m$ provided the carrier frequency is not too far removed from the intelligence bandwidth. In most instances, particularly in scatter communication where the carrier frequencies are relatively high, it is advantageous to employ the system illustrated in the drawing. It should be further pointed out in accordance with the drawing that the value of $f_{if}$ need not be identical in each of the receiving channels since the frequency of the oscillators in the remainder of the circuit, the combining arrangement, can be adjusted in value to produce the desired identical intelligence bandwidth at the output of their respective heterodyning circuits.

To carry out the teachings of this invention, that is, the modification of the phase versus frequency characteristics of the intelligence signals of the receiving channels, the following arrangement will be employed. The intelligence bandwidth $f_m$ will be recovered from the output of amplifier 9 by means of mixer 11 and oscillator 12 wherein the frequency of oscillator 12 is equal to the frequency $f_{if}$ at the output of amplifier 9 to provide at the output of mixer 11 the intelligence bandwidth $f_m$. The output of amplifier 10, which is $f_{if}+f_m$, is coupled to a plurality of circuits 13 which act to recover the intelligence bandwidth and to divide the intelligence spectrum into a plurality of discrete bandwidth segments. Each of the circuits 13 include a mixer 14 and an oscillator 15. The frequency of oscillator 15 is chosen to equal the frequency $f_{if}$ at the output of amplifier 10, such that the converting action in mixer 14 produces at the output thereof the intelligence signal $f_m$. The output of mixer 14 of each of the circuits 13 are coupled to band-pass filters 16 with each of band-pass filters 16 having a pass band to divide the intelligence bandwidth into a given number of continuous bandwidth segments.

In accordance with the illustration in the drawing, the band pass of filter 16 is chosen by the formula $$f=\frac{f_m}{n}$$

where $f_m$ is equal to the intelligence bandwidth, $n$ is equal to the number of segments into which $f_m$ is to be divided and $f$ is equal to the bandwidth of the bandwidth segments. The number of bandwidth segments into which the intelligence bandwidth is divided is further dictated by the fact that it is necessary to choose the 3 db bandwidth of the filters 16 to prevent two selective fading nulls from appearing in one filter pass band thereby limiting the phase versus frequency variation in one filter to less than 180 degrees. Further, the absolute filter bandwidths are determined by a probability distribution of time delays present in a given communication path. For instance, on the 3,200-mile transatlantic radio-telephone link, maximum time delay differences of about 2 milliseconds occur. If the arrangement illustrated in the drawing were incorporated into this system, six 500-cycle bandwidth filters 16 would be required for each 3 k.c. intelligence channel.

The output of band-pass filters 16 are coupled to phase detectors 17 wherein the phase of the filtered portion of the intelligence signal is compared with the phase of the corresponding frequency portion of the intelligence signal at the output of mixer 11. Phase detector 17 may be a balanced modulator type phase detector which compares the phase of two signals that are in a 90-degree phase relationship when no D.C. control signal is produced. Thus, to add the output of mixer 11 in phase with the combined outputs of band-pass filters 16, it is necessary to provide 90-degree phase shifter 21. Phase detector 17 may be a modified version of a balanced modulator which compares the phase of the input signals thereto when these signals are in phase or may include a phase shifter therein to render the signals in the desired 90-degree phase relationship. In each of these latter instances phase shifter 21 may be eliminated, such as by switch 22. Regardless of which phase detector arrangement is used, a control signal will not be produced unless the detector compares two signals of the same frequencies, which is the normal behavior of such devices. Phase detector 17 provides a control signal which is proportional to the phase difference between that portion of the intelligence signal which comes through band-pass filter 16 and the corresponding portion of the intelligence signal at the output of mixer 11. This control signal is coupled through a low pass integrating network 18 to the oscillator 15 so that the frequency output of oscillator 15 is adjusted in accordance with the control signal to render the output of mixer 14 or at least that portion of the output of mixer 14 which passes through band-pass filter 16 in a predetermined relationship with the corresponding frequency portion of the intelligence signal at the output of mixer 11.

In summary it may be stated that the operation of mixer 11 and oscillator 12 and the mixers 14 and oscillators 15 provides through synchronous detection the baseband or intelligence spectrum. Further, the baseband or intelligence spectrum produced by oscillators 15 and mixers 14 is broken into successive bandwidth segments by the action of band-pass filters 16, the output of which is compared in phase with the like frequency portion of the output of mixer 11 to produce a control signal proportional to the phase difference of these two signals. The developed control signal controls the frequency of oscillators 15 to adjust the phase relationship of the output of band-pass filters 16 to cause phase coincidence between the output of band-pass filters 16 with the like frequency portion of the intelligence spectrum at the output of mixer 11.

Band-pass filters 16 may be single tuned circuits arranged in a bank so that the composite sum of their outputs is constant. This is one of a class of constant resistance networks. It has been proven rigorously that no phase or amplitude distortion arises when the outputs from the filters of this type are recombined if the crossover frequencies between adjacent filters are set at the 3 db point. Other configurations are possible for meeting this requirement.

The phases of the filtered intelligence band segments as illustrated in the drawing are controlled by a form of automatic phase control loop which compares the relative phase of a filtered intelligence band segment and the same frequencies in the unfiltered signal at the output of mixer 11 and feeds back a D.C. voltage through the low pass integrating network 18 which causes oscillator 15, which may be of the free-running type, to vary the phase of the filtered segments. As slow changes in phase occur between the received signals, the integrating network 18 has negligible effect on the control voltage and the unfiltered signal, the output of mixer 11, is tracked to maintain phase lock between the filtered segments of the intelligence bandwidth and the unfiltered segments. For sudden large phase changes between the received signals, the mechanism is the same with the filter smoothing the oscillator response. For abrupt frequency changes in the received signals, an asymmetrical frequency modulation having a D.C. component is produced in oscillators 15 which restores the phase lock between the output of band-pass filter 16 and the corresponding portions of the unfiltered intelligence at the output of mixer 11. Oscillators 15 may be controlled in frequency by the usual reactance tube arrangement. The phase versus frequency characteristics of filter 18 must be controlled as any well-know servo or feedback system.

The outputs from band-pass filters 16 are then coupled to resistors 19 to recombine the bandwidth segments of the intelligence bandwidth. The output from mixer 11 is coupled to resistor 20 and hence may be combined with the combined bandwidth segments to produce a single output which has no additional nulls in the spectrum due to phase opposition addition of the two received signals and the nulls originally present in either received signals have been substantially eliminated by this addition. There is one exception where nulls will occur in the combined output of the filtered and unfiltered signals and that is for the relatively improbable condition of simultaneous selective fades at the same frequency in both receiving channels.

While we have described above the principles of our invention in connection with specific apparatus, it is to be clearly understood that this description is made only by way of example and not as a limitation to the scope of our invention as set forth in the objects thereof and in the accompanying claims.

We claim:

1. A diversity receiving system comprising a plurality of receiving channels to receive the same intelligence signals, said signals having unknown and varying phase relationship relative to each other, means to add the output intelligence signals of said channels, and means to modify the phase versus frequency characteristic of that portion of the intelligence signal occurring in each of a plurality of bandwidth segments of the intelligence bandwidth of at least one of said channels with respect to the corresponding frequency portion of the intelligence signal of the other of said channels prior to addition in said adder means to substantially eliminate phase opposition of the added signals in the intelligence pass band and thereby substantially eliminate nulls in the combined intelligence signal at the output of said adder means.

2. A diversity receiving system comprising a plurality of receiving channels to receive the same intelligence signals, said signals having unknown and varying phase relationship relative to each other, means to add the output intelligence signals of said channels, means to divide the intelligence bandwidth of at least one of said channels into a plurality of bandwidth segments, and means to modify the phase versus frequency characteristic of that portion of the intelligence signal occurring in each of said bandwidth segments with respect to the corresponding frequency portion of the intelligence signal of other of said channels prior to addition in said adder means to substantially eliminate phase opposition of the added signals in the intelligence pass band and thereby substantially eliminate nulls in the combined intelligence signal at the output of said adder means.

3. A diversity receiving system comprising two receiving channels to receive the same intelligence signals, said signals having unknown and varying phase relationship relative to each other, means to add the output intelligence signals of said channels, means to divide the intelligence bandwidth of one of said channels into a plurality of bandwidth segments, and means to modify the phase versus frequency characteristic of that portion of the intelligence signal occurring in each of said bandwidth segments with respect to the corresponding frequency portion of the intelligence signal of the other of said channels prior to addition in said adder means to substantially eliminate phase opposition of the added signals in the intelligence pass band and thereby substantially eliminate nulls in the combined intelligence signal at the output of said adder means.

4. A diversity receiving system comprising two receiving channels to receive the same intelligence signals, said signals having unknown and varying phase relationship relative to each other, means to add the output intelligence signals of said channels, and means to modify the phase versus frequency characteristic of the intelligence signal of one of said channels with respect to the phase versus frequency characteristic of the other of said channels prior to the addition in said adder means to substantially eliminate phase opposition of the added signals in the intelligence pass band and thereby substantially eliminate nulls in the combined intelligence signal at the output of said adder means, said means to modify including means to recover said intelligence signals in said other of said channels, means to divide the intelligence bandwidth of said one of said channels into a plurality of bandwidth segments, means to detect the phase difference between that portion of the intelligence signal occurring in each of said bandwidth segments and the corresponding frequency portion of the intelligence signal of said other of said channels to produce a control signal proportional to said phase difference and means responsive to each of said control signals to adjust the phase of that portion of the intelligence signal occurring in the corresponding one of said bandwidth segments for phase coincidence with the intelligence signal of said corresponding portion.

5. A diversity receiver comprising a first and second signal receiving channel, the signals of said channels having the same intelligence signal in the same intelligence bandwidth and having unknown and varying phase relationship relative to each other, means coupled to one of said channels to recover said intelligence signal, means coupled to the other of said channels to divide said intelligence bandwidth into a plurality of equal bandwidth segments, means for detecting the phase difference between that portion of the intelligence signal occurring in each of said bandwidth segments and the corresponding portion of the intelligence signal recovered from said one of said channels to produce a control signal proportional to said phase difference, means responsive to each of said control signals to adjust the phase of that portion of the intelligence signal occurring in the corresponding one of said bandwidth segments for phase coincidence with the intelligence signal of said corresponding portion, means to combine the outputs of said means to divide and means to add the recovered intelligence signal of said one of said channels to the output of said combiner means.

6. A diversity receiver comprising a first and second signal receiving channel, the signals of said channels having the same intelligence in the same intelligence bandwidth and having unknown and varying phase relationship relative to each other, means coupled to one of said channels to recover said intelligence signal, a plurality of means coupled to the other of said channels to recover the intelligence signal thereof, means coupled to each of said plurality of means to divide the intelligence bandwidth into a plurality of continuous bandwidth segments, means coupled to each of said means to divide for detecting the phase difference between that portion of the intelligence signal occurring in each of said bandwidth segments and the corresponding portion of the intelligence signal recovered from said one of said channels to produce a control signal proportional to said phase difference, means responsive to each of said control signals to adjust the phase of that portion of the intelligence signal occurring in the corresponding one of said bandwidth segments for phase coincidence with the intelligence signal of said corresponding portion, means to combine the outputs of said means to divide and means to add the recovered intelligence signal of said one of said channels to the output of said combiner means.

7. A diversity receiver comprising a first and second signal receiving channel, the signals of said channels having the same intelligence signal in the same intelligence bandwidth and having unknown and varying phase relationship relative to each other, means coupled to one of said channels to recover said intelligence signal, a plurality of circuit means coupled to the other of said channels, each of said circuit means including an oscillator, a mixer coupled to said other of said channels and said oscillator to recover from the signal of said other of said channels said intelligence signal, a band-pass filter coupled to the output of said mixer, the pass band of the band-pass filters of adjacent ones of said circuit means being contiguous to divide said intelligence bandwidth into a plurality of bandwidth segments, a detector coupled to the output of said band-pass filter and the output of said means coupled to said one of said channels to detect the phase difference between that portion of the intelligence signal occurring in each of said bandwidth segments and the corresponding portion of the intelligence signal recovered from said one of said channels to produce a control signal proportional to said phase difference, and means to couple said control signal to said oscillator to adjust the phase of that portion of the intelligence signal occurring in the corresponding one of said bandwidth segments for phase coincidence with the intelligence signal of said corresponding portion, means to combine the outputs of each of said band-pass filters and means to add the recovered intelligence signal of said one of said channels to the output of said combiner means.

8. A diversity receiver comprising a first and second signal receiving channel, the signals of said channels having the same intelligence signal in the same intelligence bandwidth and having unknown and varying phase relationship relative to each other, means coupled to one of said channels to recover said intelligence signal, a plurality of circuit means coupled to the other of said channels, each of said circuit means including an oscillator, a mixer coupled to said other of said channels and said oscillator to recover from the signal of said other of said channels said intelligence signal, a band-pass filter coupled to the output of said mixer, the pass band of the band-pass filter of adjacent ones of said circuit means being contiguous to divide said intelligence bandwidth into a plurality of bandwidth segments, a detector coupled to the output of said band-pass filter and the output of said means coupled to said one of said channels to detect the phase difference between that portion of the intelligence signal occurring in each of said bandwidth segments and the corresponding portion of the intelligence signal recovered from said one of said channels to produce a control signal proportional to said phase difference, and a low pass filter to couple said control signal to said oscillator to adjust the phase of that portion of the intelligence signal occurring in the corresponding one of said bandwidth segments for phase coincidence with the intelligence signal of said corresponding portion, means to combine the outputs of each of said band-pass filters and means to add the recovered intelligence signal of said one of said channels to the output of said combiner means.

9. A diversity receiver comprising a first and second signal receiving channel, the signals of said channels having the same intelligence signal in the same intelligence bandwidth and having unknown and varying phase relationship relative to each other, heterodyning means coupled to one of said channels to recover said intelligence signal, a plurality of circuit means coupled to the other of said channels, each of said circuit means including an oscillator, a mixer coupled to said other of said channels and said oscillator to recover from the signal of said other of said channels said intelligence signal, a band-pass filter coupled to the output of said mixer, the pass band of the band-pass filters of adjacent ones of said circuit means being contiguous to divide said intelligence bandwidths into a plurality of bandwidth segments, a detector coupled to the output of said band-pass filter and the output of said heterodyning means to detect the phase difference between that portion of the intelligence signal occurring in each of said bandwidth segments and the corresponding portion of the intelligence signal recovered from said one of said channels to produce a control signal proportional to said phase difference, and a low pass filter to couple said control signal to said oscillator to adjust the phase of that portion of the intelligence signal occurring in the corresponding one of said bandwidth segments for phase coincidence with the intelligence signal of said corresponding portion, means to combine the outputs of each of said band-pass filters and means to add the recovered intelligence signal of said one of said channels to the output of said combiner means.

10. An automatic phase control system comprising a first and second signal source, the signals of said sources having the same intelligence signal in the same intelligence bandwidth and having unknown and varying phase relationship relative to each other, means coupled to one of said sources to recover said intelligence signal, means coupled to the other of said sources to divide said intelligence bandwidth into a plurality of equal bandwidth segments, means for detecting the phase difference between that portion of the intelligence signal occurring in each of said bandwidth segments and the corresponding portion of the intelligence signal recovered from said one of said sources to produce a control signal proportional to said phase difference, means responsive to each of said control signals to adjust the phase of that portion of the intelligence signal occurring in the corresponding one of said bandwidth segments for phase coincidence with the intelligence of said corresponding portion, and means to combine the outputs of said means to divide to thereby provide two identical phase coincident signals.

11. An automatic phase control system comprising a first and second signal source, the signals of said sources having the same intelligence signal in the same intelligence bandwidth and having unknown and varying phase relationship relative to each other, means coupled to one of said sources to recover said intelligence signal, a plurality of means coupled to the other of said sources to recover the intelligence signal thereof, means coupled to each of said plurality of means to divide the intelligence bandwidth into a plurality of continuous bandwidth segments, means coupled to each of said means to divide for detecting the phase difference between that portion of the intelligence signal occurring in each of said bandwidth segments and the corresponding portion of the intelligence signal recovered from said one of said sources to produce a control signal proportional to said phase difference, means responsive to each of said control signals to adjust the phase of that portion of the intelligence signal occurring in the corresponding one of said bandwidth segments for phase coincidence with the intelligence of said corresponding portion, and means to combine the outputs of said means to divide to thereby provide two identical phase coincident signals.

12. An automatic phase control system comprising a first and second signal source, the signals of said sources having the same intelligence signal in the same intelligence bandwidth and having unknown and varying phase relation relative to each other, means coupled to one of said sources to recover said intelligence signal, a plurality of circuit means coupled to the other of said sources, each of said circuit means including an oscillator, a mixer coupled to said other of said channels and said oscillator to recover from the signal of said other of said sources said intelligence signal, a band-pass filter coupled to the output of said mixer, the pass band of the band-pass filter of adjacent ones of said circuit means being contiguous to divide said intelligence bandwidth into a plurality of bandwidth segments, a detector coupled to the output of said band-pass filter and the output of said means coupled to said one of said channels to detect the phase difference between that portion of the intelligence signal occurring in each of said bandwidth segments and the corresponding portion of the intelligence signal recovered from said one of said sources to produce a control signal proportional to said phase difference, and means to couple said control signal to said oscillator to adjust the phase of that portion of the intelligence signal occurring in the corresponding one of said bandwidth segments for phase coincidence with the intelligence signal of said corresponding portion, and means to combine the outputs of each of said band-pass filters to provide two identical phase coincident signals.

13. An automatic phase control system comprising a first and second signal source, the signals of said sources having the same intelligence signal in the same intelligence bandwidth and having unknown and varying phase relation relative to each other, means coupled to one of said sources to recover said intelligence signal, a plurality of circuit means coupled to the other of said sources, each of said circuit means including an oscillator, a mixer coupled to said other of said channels and said oscillator to recover from the signal of said other of said sources, said intelligence signals, a band-pass filter coupled to the output of said mixer, the pass band of the band-pass filter of adjacent ones of said circuit means being contiguous to divide said intelligence bandwidth into a plurality of bandwidth segments, a detector coupled to the output of said band-pass filter and the output of said means coupled to said one of said channels to detect the phase difference between that portion of the intelligence signal occurring in each of said bandwidth segments and the corresponding portion of the intelligence signal recovered from said one of said sources to produce a control signal proportional to said phase difference, and a low pass integrating network to couple said control signal to said oscillator to adjust the phase of that portion of the intelligence signal occurring in the corresponding one of said bandwidth segments for phase coincidence with the intelligence signal of said corresponding portion, and means to combine the outputs of each of said band-pass filters to provide two identical phase coincident signals.

14. An automatic phase control system comprising a first and second signal source, the signals of said sources having the same intelligence signal in the same intelligence bandwidth and having unknown and varying phase relation relative to each other, heterodyning means coupled to one of said sources to recover said intelligence signal, a plurality of circuit means coupled to the other of said sources, each of said circuit means including an oscillator, a mixer coupled to said other of said channels and said oscillator to recover from the signal of said other of said sources said intelligence signals, a band-pass filter coupled to the output of said mixer, the pass band of the band-pass filter of adjacent ones of said circuit means being contiguous to divide said intelligence bandwidth into a plurality of bandwidth segments, a detector coupled to the output of said band-pass filter and the output of said means coupled to said one of said channels to detect the phase difference between that portion of the intelligence signal occurring in each of said bandwidth segments and the corresponding portion of the intelligence signal recovered from said one of said sources to produce a control signal proportional to said phase difference, and a low pass integrating network to couple said control signal to said oscillator to adjust the phase of that portion of the intelligence signal occurring in the corresponding one of said bandwidth segments for phase coincidence with the intelligence signal of said corresponding portion, and means to combine the outputs of each of said band-pass filters to provide two identical phase coincident signals.

References Cited in the file of this patent

UNITED STATES PATENTS

| | | |
|---|---|---|
| 2,505,266 | Villem | Apr. 25, 1950 |
| 2,629,816 | Rabuteau | Feb. 24, 1953 |
| 2,735,003 | Peterson | Feb. 14, 1956 |
| 2,775,701 | Israel | Dec. 25, 1956 |
| 2,786,133 | Dyke | Mar. 19, 1957 |
| 2,844,716 | Jacobsen | July 22, 1958 |
| 2,855,506 | Schabauer | Oct. 7, 1958 |